United States Patent Office 3,240,743
Patented Mar. 15, 1966

3,240,743
VINYLIDENE CHLORIDE POLYMER COMPOSITIONS HAVING IMPROVED LOW TEMPERATURE PROPERTIES
George J. Butzler, Midland, and William D. Shelburg, Bay City, Mich., and George B. Sterling, Mogadore, Ohio, assignors to The Dow Chemical Company, Midland, Mich., a corporation of Delaware
No Drawing. Filed Apr. 18, 1963, Ser. No. 273,810
10 Claims. (Cl. 260—31.8)

This invention relates to polymeric compositions and, in particular, to polymeric compositions based on vinylidene chloride polymers and copolymers.

Polymers and copolymers of vinylidene chloride with such comonomers as acrylonitrile, vinyl chloride, and lower alkyl acrylates have found wide use as films for packaging of foodstuffs and other articles. Such films possess many useful properties, such as inertness, ability to be heat-sealed, transparency, shrinkability, and low water vapor transmission rates, which are desirable for packaging foodstuffs. However, prior vinylidene chloride polymer films suffered the disadvantage of becoming brittle and losing strength and other qualities at low temperatures. Prior art attempts to plasticize these copolymers have not generally been successful in overcoming those problems. The compatibility of liquid plasticizers also have a tendency to bleed out of the composition which is undesirable for packaging of certain foods.

According, it is a principal object of this invention to provide polymeric compositions based on polymers of vinylidene chloride which compositions retain their flexibility and other properties at low temperatures, such as are encountered in refrigerated foodstuffs and frozen foodstuffs.

It is a further object of this invention to provide polymeric compositions which are relatively impermeable to water vapor and other gases.

Other and related objects will become evident from the following specification and claims.

The polymeric compositions of this invention comprise a blend of (I) from 70 to 95 percent by weight of the composition of a normally crystalline polymer consisting of (a) from 70 to 100 percent by weight of vinylidene chloride and (b) 0 to 30 percent by weight of at least one monoethylenically unsaturated comonomer and (II) complementarily, from 5 to 30 percent by weight of the composition of a rubbery interpolymer consisting of (1) at least 5 percent by weight of an open chain aliphatic conjugated diolefin having from 4 to about 9 carbon atoms, (2) at least about 35 percent by weight of an alkyl ester of acrylic acid containing from 4 to 8 carbon atoms in the alkyl constituent and (3) between 5 and 30 percent by weight of at least one monomer selected from the group consisting of a lower alkyl-lower alkenyl ketone and a lower alkyl alkacrylate, as hereinafter defined.

The normally crystalline vinylidene chloride polymers usable in this invention are well known and may be prepared by interpolymerizing vinylidene chloride with known comonomers. Typical of the normally crystalline polymeric materials falling within the advantageous definition are the polymers and copolymers of at least 70 percent by weight of vinylidene chloride with the remainder composed of one or more other monoethylenically unsaturated comonomers exemplary of which are vinyl chloride, vinyl acetate, vinyl propionate, acrylonitrile, alkyl and aralkyl acrylates having alkyl and aralkyl groups of up to about 8 carbon atoms, acrylic acid, acrylamide, vinyl alkyl ethers, vinyl alkyl ketones, acrolein, allyl esters and ethers, butadiene and chloropropene. Known ternary compositions also may be employed advantageously. Representative of such polymers are those composed of at least 70 percent by weight of vinylidene chloride with the remainder made up of, for example, acrolein and vinyl chloride, acrylic acid and acrylonitrile, alkyl acrylates and alkyl methacrylates, acrylonitrile and butadiene, acrylonitrile and itaconic acid, acrylonitrile and vinyl acetate, vinyl propionate, or vinyl chloride, allyl esters or ethers and vinyl chloride, butadiene and vinyl acetate, vinyl propionate, or vinyl chloride, and vinyl ethers and vinyl chloride. Quaternary polymers of similar monomeric compositions will also be known.

The rubbery interpolymers which impart low temperature flexibility to the vinylidene chloride polymer are interpolymers of the herein prescribed amounts of (1) an open chain aliphatic conjugated diolefin having from 4 to about 9 carbon atoms such as butadiene or isoprene, with (2) an alkyl ester of acrylic acid containing from 4 to 8 carbon atoms in the alkyl constituent, such as butyl acrylate, hexyl acrylate, 2-ethylhexyl acrylate, and the like and (3) at least one monomer selected from the group consisting of a lower alkyl-lower alkenyl ketone, exemplary of which are methyl isopropenyl ketone, ethyl vinyl ketone, and methyl vinyl ketone; and lower alkyl alkacrylates, such as methyl methacrylate, isopropyl methacrylate, butyl methacrylate, methyl ethacrylate, ethyl ethacrylate, and propyl ethacrylate. The contemplated interpolymers are rubbery materials having a Mooney viscosity at 212° F. of about 3 to 100, and preferably in the range of 5 to 40. The rubbery interpolymers are known and may be prepared by polymerization of the monomers in aqueous emulsion, as, for example, by the procedures as generally disclosed in the U.S. Patent No. 2,462,354, issued February 22, 1949.

The polymer blends of the invention may include plasticizers, such as dioctyl phthalate, dibutyl sebacate, and the like, in the range of about 2 to 10 percent by weight of the composition. The polymer blends may also include antioxidants, light stabilizers, and other additives known in the art which do not deleteriously affect the properties of the film.

The polymer blends of the invention are preferably prepared by: mixing latexes of the vinylidene chloride polymers and of the rubber interpolymer in the proper proportions, coagulating the latex blend with alum or other known coagulants, and recovering the dried polymer. The polymer blends are preferably extruded in tube form, stretched and oriented by the bubble technique and slit to form films as is known in this art. The compositions are useful in other processes, such as molding, slot extrusion, and other thermal fabrication techniques, to form films, fibers, foils, molded articles, and other forms having the superior properties.

The products of this invention will be illustrated with the following example in which all percentages and parts are by weight.

Example

A latex containing about 34 percent solids of a copolymer composed of 73 percent by weight vinylidene chloride and 27 percent by weight of vinyl chloride was prepared by emulsion polymerization, utilizing a mixture of potassium sulfate and sodium bisulfite as the catalyst, and an alkyl benzene sodium sulfonate, available commercially as "Ultrawet DS," as the emulsifier in a manner well known in the art.

Several batches of rubbery latexes were prepared composed of varying amounts of butadiene, an alkyl ester of acrylic acid as described herein, methyl isopropenyl ketone of methyl methacrylate, and up to 1 percent of the antioxidant 2,6-ditertiary butyl-4-methylphenol and 0.46 percent of the chain transfer agent 1,2-dibromo-1,1-dichloroethane, based on the weight of the monomeric constituents, to form latexes having between about 25 and 40 percent solids content. Such latexes were prepared at a temperature of about 70° C. utilizing potassium persulfate as the catalyst and sodium lauryl sulfonate as the emulsifier.

Separate polymer blends composed of (I) 85 percent by weight of the vinylidene chloride/vinyl chloride copolymer as described herein, and (II) 15 percent by weight of the rubbery interpolymer described herein were formed by individually blending such polymeric latexes in the desired proportions, and subsequently coagulating and drying the same. To each polymer blend was then individually added 7 percent by weight, based on the total weight of the blend, of the plasticizer dibutyl sebacate and 1 percent by weight of an ester of an epoxidized fatty acid, available commercially as "Paraplex G–60."

Individual samples of the polymer blend were thermally extruded using standard bubble techniques into oriented films having a thickness of 0.001 inch. A similarly prepared film of unmodified vinylidene chloride copolymer containing 7 percent dibutyl sebacate and 1 percent "Paraplex G–60"; and a similarly prepared film composed of vinylidene chloride copolymer containing 15 percent by weight of butyl acrylate plus the indicated amounts of the dibutyl sebacate and "Paraplex G–60" were employed for comparative purposes.

The following table illustrates the composition of the rubbery latex, and the results of the physical properties determined on the above-described oriented films. The column headings of such table have the following meanings:

Clarity—Visual rating of oriented film
Cold flex—Number of hand flexes at −18° C. (0° F.) to produce rupture Tensile strengths, both longitudinal and transverse, and percent elongation, for each of the oriented films were determined by conventional techniques utilizing a Scott IP–4 Tester. Oxygen transmission data were obtained as cc. at S.T.P./100 in.²/24 hrs./mil at 1 atmosphere driving force.

TABLE.—ORIENTED FILM

[Blends of 85 percent vinylidene chloride copolymer and 15 percent rubbery interpolymer and 7 percent dibutyl sebacate and 1 percent "Paraplex G–60"]

| Run No. | Rubbery Interpolymer Latex | | | | | | Physical Properties of Oriented Film | |
|---|---|---|---|---|---|---|---|---|
| | Butadiene, Percent | Alkyl Acrylate | | Methyl Methacrylate, Percent | Methyl Isopropenyl Ketone, Percent | Mooney Viscosity | Clarity | Cold Flex −18° C. |
| | | Kind | Percent | | | | | |
| FOR COMPARISON | | | | | | | | |
| 1 | | | | | | | Good | 1 |
| 2 | | Butyl Acrylate | 100 | | | 5–10 | Fair | 1 |
| THIS INVENTION | | | | | | | | |
| 3 | 5 | do | 75 | 20 | | 10 | Good | 2 |
| 4 | 35 | do | 35 | 30 | | 31 | Poor | 10+ |
| 5 | 40 | do | 40 | 20 | | 26 | Good | 7 |
| 6 | 47.5 | do | 47.5 | 5 | | 28 | do | 10+ |
| 7 | 40 | do | 40 | | 20 | 28 | do | 10 |

From the above data it can be seen that incorporation of the rubbery interpolymer, as described herein, into normally crystalline vinylidene chloride polymers produces most favorable films and other articles for low temperature utility. It has further been found that the oxygen transmisison, tensile strength and elongation of oriented films prepared from all of the herein described compostions, are within the range desirable for commercially acceptable vinylidene chloride polymer films.

Similar good results are obtained from any composition comprising (I) from about 70 to 95 percent by weight of the composition of a normally crystalline polymer consisting of (a) 70 to 100 percent by weight of vinylidene chloride and (b) 0 to 30 percent of at least one monoethylenically unsaturated comonomer and (II) from about 5 to 30 percent by weight of the composition of a rubbery interpolymer as described herein.

We claim:
1. A polymeric composition comprising a blend of (I) from about 70 to 95 percent by weight of the composition of a normally crystalline polymer selected from the group consisting of polyvinylidene chloride and interpolymers of at least about 70 percent by weight of vinylidene chloride with up to about 30 percent by weight of at least one other monoethylenically unsaturated comonomer and (II) complementarily, from about 5 to 30 percent by weight of the composition of a rubbery interpolymer consisting of (1) at least about 5 percent by weight of an open chain aliphatic conjugated diolefin having from 4 to about 9 carbon atoms, (2) at least about 35 percent by weight of an alkyl ester of acrylic acid containing from 4 to 8 carbon atoms in the alkyl constituent and (3) between about 5 and 30 percent by weight of at least one monomer selected from the group consisting of a lower alkyl-lower alkylene ketone, a lower alkyl methacrylate and a lower alkyl ethacrylate.

2. The composition as claimed in claim 1, wherein said normally crystalline polymer is a copolymer of vinylidene chloride and vinyl chloride.

3. The composition as claimed in claim 2, wherein said normally crystalline polymer is a copolymer of 73 percent by weight of vinylidene chloride and 27 percent by weight of vinyl chloride.

4. The composition as claimed in claim 1, wherein said rubbery interpolymer is composed of (1) butadiene, (2) butyl acrylate, and (3) methylisopropenyl ketone.

5. The composition as claimed in claim 1, wherein said rubbery interpolymer is composed of (1) butadiene, (2) butyl acrylate, and (3) methyl methacrylate.

6. The composition as claimed in claim 1, containing from 2 to 10 percent by weight of the composition of a plasticizer for a crystalline vinylidene chloride polymer.

7. The composition as claimed in claim 6, wherein said plasticizer is dibutyl sebacate.

8. A polymeric composition comprising a blend of (I) 85 percent by weight of the composition of a normally crystalline polymer consisting of (a) 73 percent by weight of vinylidene chloride and (b) 27 percent by weight of vinyl chloride and (II) 15 percent by weight of a rubbery interpolymer consisting of (1) from 5 to 47.5 percent by weight of butadiene, (2) from 35 to 75 percent by weight of butyl acrylate, and (3) from 5 to 30 percent by weight of a monomer selected from the group consisting of methyl methacrylate and methyl isopropenyl ketone.

9. An oriented film having improved flexibility at temperatures below 32° F. composed of a homogeneous blend of (I) about 85 percent by weight of the composition of a normally crystalline polymer consisting of (a) 73 percent by weight of vinylidene chloride and (b) 27 percent by weight of vinyl chloride and (II) about 15 percent by weight of the film of a rubbery interpolymer consisting of (1) at least 5 percent by weight of an open aliphatic conjugated diolefin having from 4 to about 9 carbon atoms, (2) at least about 35 percent by weight of an alkyl ester of acrylic acid containing from 4 to 8 carbon atoms in the alkyl constituent and (3) between 5 and 30 percent by weight of at least one monomer selected from the group consisting of a lower alkyl-lower alkenyl ketone, a lower alkyl methacrylate and a lower alkyl ethacrylate.

10. An oriented film having improved flexibility at temperatures below 32° F. composed of a homogeneous blend of (I) about 85 percent by weight of the film of a normally crystalline polymer consisting of (a) 73 percent by weight of vinylidene chloride and (b) 27 percent by weight vinyl chloride and (II) about 15 percent by weight of the film of a rubbery interpolymer consisting of (1) from 5 to 47.5 percent by weight of butadiene, (2) from 35 to 75 percent by weight of butyl acrylate, and (3) from 5 to 30 percent by weight of a monomer selected from the group consisting of methyl methacrylate and methyl isopropenyl ketone.

References Cited by the Examiner
UNITED STATES PATENTS

| | | | |
|---|---|---|---|
| 2,614,094 | 10/1952 | Wheelock | 260—891 |
| 2,646,471 | 7/1953 | Jennings | 260—31.8 |
| 2,656,333 | 10/1953 | Schaffel et al. | 260—891 |
| 2,719,137 | 9/1955 | Tawney | 260—45.5 |
| 3,005,796 | 10/1961 | Dreisbach | 260—31.8 |
| 3,084,065 | 4/1963 | Bach | 260—45.5 |

FOREIGN PATENTS 745,118   2/1956   Great Britain.

OTHER REFERENCES

Buttrey, Plasticizers, Franklin Publishing Co., New Jersey, Chap. 4, page 76, 1960.

MORRIS LIEBMAN, *Primary Examiner.*

ALEXANDER H. BRODMERKEL, *Examiner.*